Oct. 23, 1962     H. S. NATHANSON     3,059,410
TEMPERATURE CONTROLLED TIMING DEVICE
Filed Oct. 7, 1959                         2 Sheets-Sheet 1
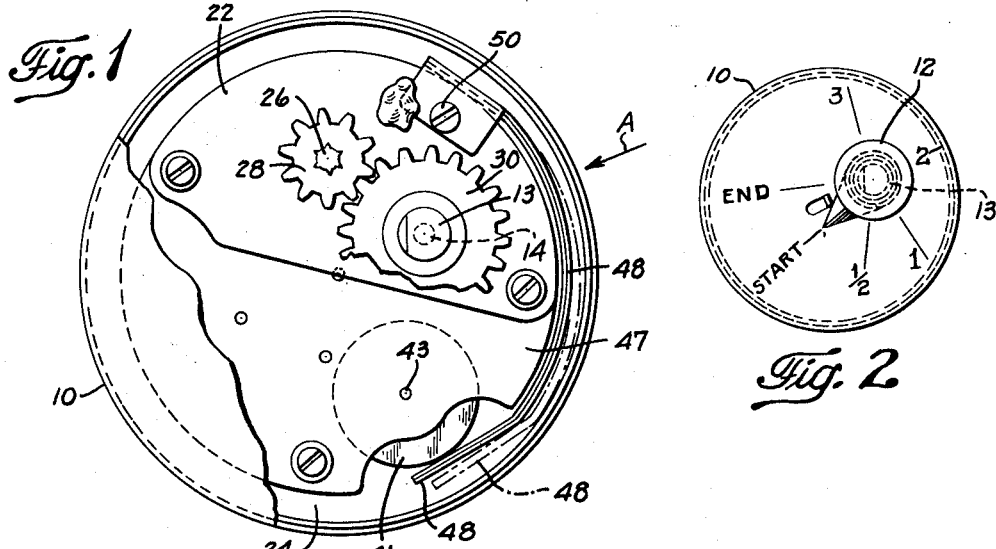
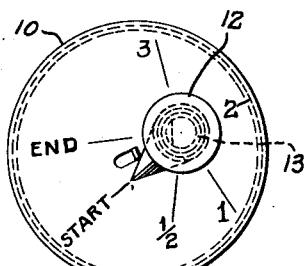
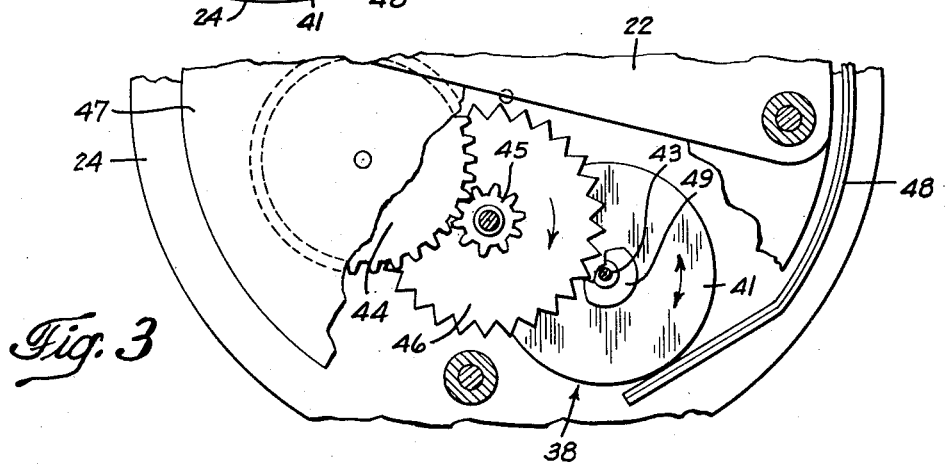
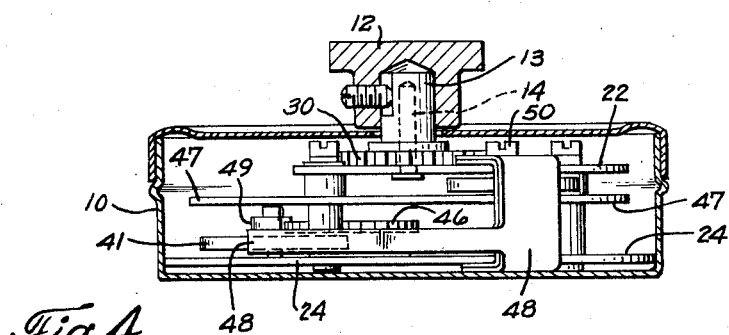
INVENTOR.
HERMAN S. NATHANSON
BY
Morgan, Finnegan, Durham & Pine
ATTORNEYS

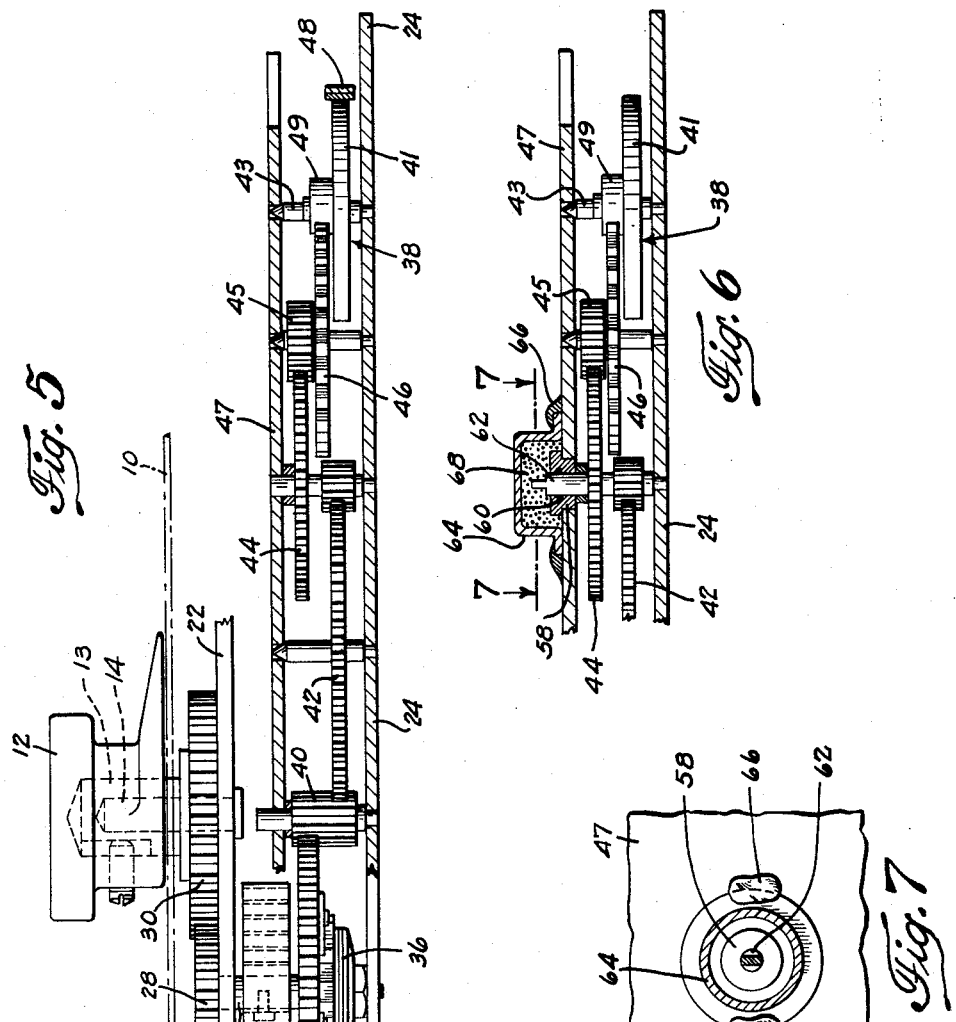

United States Patent Office 3,059,410
Patented Oct. 23, 1962

3,059,410
TEMPERATURE CONTROLLED TIMING DEVICE
Herman S. Nathanson, New York, N.Y., assignor to Scientific Equipment Manufacturing Corporation, New York, N.Y., a corporation of New York
Filed Oct. 7, 1959, Ser. No. 844,970
4 Claims. (Cl. 58—22.9)

This invention relates to timing devices and particularly to an improved temperature controlled timer for indicating the period of time during which the timer is at a temperature outside a given range.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

FIGURE 1 is a top plan view of the timing device of the invention with the cover of the case removed;

FIGURE 2 is a top plan view of the timer in its casing;

FIGURE 3 is a fragmentary detailed top plan view with certain parts in section and others broken away to show the details of construction;

FIGURE 4 is a side view of the timer with the casing being broken away on the diametrical line A and with the view being taken normal to this line;

FIGURE 5 is a developed vertical sectional view through the timing device showing the gears as though their axes were in a single plane;

FIGURE 6 is a fragmentary vertical sectional view of a modified embodiment of the invention; and, FIGURE 7 is a horizontal section taken along line 7—7 of FIGURE 6.

The present invention has for an object the provision of an improved temperature controlled timer which is extremely simple to operate and manufacture and yet is highly reliable in operation. A further object is the provision of such an economic and reliable temperature control timer which is self-starting from any position that the temperature control device may stop it. Still another object of the invention is the provision of such a simple and economic temperature controlled timing device which may be employed to indicate the period of time that a particular temperature is above or below a desired value with no special consideration being required such as vibrating the timer or constructing the temperature control device in a particular manner in order to be assured that the timer will start in any position in which it may be stopped by the control device.

In accordance with the present invention the timing mechanism includes a spring powered gear train that is adapted to run at a constant rate which is regulated by a self-starting balance wheel escapement mechanism. This escapement mechanism includes a balance wheel upon which is directly mounted the pallet that engages a pallet wheel forming part of the gear train with the teeth of this wheel and the pallet being arranged such that the escapement is self-starting in any position which it may be stopped. Forming part of the timer mechanism is a temperature responsive control which is effective to control the starting and stopping of the timer. This control may take the form of an arm or the like that is moved in response to temperature changes and is arranged to engage a portion of the timing mechanism when a predetermined temperature is reached and accordingly stop the mechanism at this temperature. This control may be employed when it is desired to either indicate the period of time that the temperature of the timer is below a given temperature or is above a given temperature. In lieu of this control the timer may be controlled by means of a fusible element which engages a portion of the gear train with this element normally being in a solid state and preventing running of the timer but becoming fluid when heated to a predetermined temperature and when fluid permitting the timing mechanism to run in its normal fashion. The entire timer is preferably housed within a substantially waterproof and airtight casing with there being a knob mounted exteriorly of the casing upon a shaft that extends through the casing housing and with this knob serving both to wind the spring of the timing mechanism and provide an indication as to the length of time that the timer has run after being initially set. The temperature responsive arm for controlling the timer is preferably in the form of a thin bimetallic strip that is mounted so that it will move in response to temperature variations into and out of contact with the periphery of the balance wheel of the self-starting balance wheel escapement. This provides an accurate control since the balance wheel periphery will be the most rapidly moving portion of the timing mechanism and accordingly will require the least force or pressure of the bimetallic strip to stop the mechanism. In the control utilizing a fusible element this may take the form of a mass of a substance within which a portion or extension of the shaft of one of the gears of the gear train is disposed, and which substance melts at a desired temperature. For this purpose, the substance may be a metal alloy, such as a low melting alloy, similar to Wood's metal, although it is usually preferable to avoid a substance having a melting range and to use a relatively pure chemical compound or substance which has a sharp melting point which is substantially the same as its freezing point. It is also preferable, for extended service, that the melting substance should be substantially non-volatile at its service temperature, although for certain applications, it may be more economical to provide for periodic replacement of the melting substance than to use a non-volatile substance which melts at substantially the same temperature. To reduce volatilization of the melting substance it may be enclosed within a closed cap fast to a frame plate and holding the melting substance in contact with the end of a gearing shaft, which may be non-circular in shape to provide a more positive grip on the shaft end.

The timer of the present invention may be used for any purpose wherein it is desirable to know the length of time that a particular temperature environment within which the timer may be disposed is above or below a given desired value, such as in the sterilization art by heating and in the refrigeration art wherein it is essential to know the length of time that predetermined temperature limits have been departed from.

It will be understood that the foregoing general description and the following detailed description as well are exemplary and explanatory of the invention but are not restrictive thereof.

Referring now to the drawings, wherein like reference characters are used throughout to designate like elements, the illustrative and preferred embodiment of the invention as depicted therein is a compact self-starting timing device which may be readily packaged in any desirable package wherein it is desired to know how long the temperature environment of the package as been above or below a predetermined desired temperature, as for example the timer may be disposed in a surgical package containing bandages, gauzes or surgical instruments that are sterilized by heating with the timer indicating whether they were heated to a minimum high temperature for the necessary time for sterilization or the timer may be disposed in a package of or shipment of whole blood to indicate whether the shipment has been maintained at its desired refrigeration temperature and has not exceeded a maximum temperature for a certain length of time. As embodied, the timing device includes a casing 10 that is preferably water and air tight and within which the mechanism of the timer is contained with the exception of a combined winding and indicating knob 12 which is secured to sleeve 13 that is mounted upon shaft 14 with the sleeve and shaft extending from the casing through a suitable opening provided therein. Knob 12 is provided with a pointer which cooperates with indices on the top of the casing to indicate the length of time that the timer has run.

The power gear train of the timer is spring operated and as embodied there is provided a spiral spring 18 (FIG. 5) which has one end fastened to a spacing post 20 between the fixed frame plates 22 and 24 with the other end of the spring fast to a winding shaft 26 which may be manually rotated by pinion 28 and gear 30, which gear is secured to shaft 14. Gear 32 is mounted on shaft 26 and is driven from spring 18 by means of the ratchet clutch 34 through friction clutch 36. Gear 32 drives the gear train 40, 42, 44 and 45 to drive pallet wheel 46, which is controlled in its running by the self starting balance wheel escapement identified generally as 38 (FIG. 3) and which includes balance wheel 41 mounted on shaft 43 journaled between the fixed plates 24 and 47 and pallet 49 also mounted on this shaft 43 directly above the balance wheel with the pallet being arcuate and having end portions or faces that engage the teeth of pallet wheel 46 in a manner that positively assures the escapement to be self-starting and have no "dead center" position. Oscillation of the balance wheel escapement, of course, regulates the running of the gear train and as long as there is tension in spring 18 tending to drive the gear train the escapement will automatically start whenever the timing mechanism is free to run.

In the embodiment of FIGURES 1 through 5 the timer is rendered temperature responsive and is controlled in accordance with the temperature thereof by means of a suitable brake arm that is in the form of a generally arcuate shaped strip of bimetal 48 that is fixedly mounted between plates 22 and 24 with the end of this strip having a flange provided thereon which overlies these plates and is secured thereto as by screws 50. The other end of the bimetal strip 48 is disposed adjacent the periphery of balance wheel 41 and is moved toward and away from the periphery as the temperature of the bimetal strip changes. When strip 48 is in engagement with balance wheel 41, the timing mechanism is stopped while when it is spaced from the balance wheel the timing mechanism is free to run. The bimetal strip 48 may be constructed to move toward the periphery of balance wheel 41 as a result of either a decrease or an increase of the temperature of the bimetal strip, with the former arrangement being employed when it is desired to have an indication of the total time that the temperature of the timer was above a given value while the latter arrangement is employed when it is desired to have the timer totalize the time that the temperature thereof is below a given value. In order to have bimetal strip 48 moved toward balance wheel 41 as the temperature of the strip is decreased so that the timer will run when a predetermined temperature has been exceeded, the metal on the concave side of the arcuate bent bimetal strip 48 will be the metal of greater coefficient of expansion, while if it is desired to have the strip move away from the balance wheel in response to decreasing the temperature of the strip so that the timer will measure the period of time that it is below a predetermined temperature, the concave layer of the bimetal member is formed of metal having the lower coefficient of expansion of the two metals that make up the bimetal member.

The temperature sensitive control member in this embodiment of the invention engages the periphery of balance wheel 41 since this is the most sensitive element of the timing mechanism with the periphery of the balance wheel when the mechanism is in operation moving the furthest of any element of the mechanism and accordingly by having the temperature sensitive element contact this periphery in order to control the stopping and starting of the time mechanism the most sensitive and accurate control obtainable is thereby produced.

It will be understood that the temperature control member 48 may be constructed and adjusted to release the timing mechanism for operation when any predetermined desired temperature is passed and it may be made to cause the timer to operate when the temperature falls below a given value or when the temperature rises above a given value.

The embodiment of FIGURES 6 and 7 utilizes a fusible material as the temperature control element rather than a bimetallic brake arm as in the embodiment of FIGURES 1 through 5. With the organization of this embodiment of FIGURES 6 and 7 the timer can be released for operation only in response to the temperature of the timer exceeding a predetermined value, however, this embodiment is prone to be very accurate in its operation and requires no adjustment since the temperature at which the particular fusible material employed will change from a solid to a liquid is a known fixed value and provides an accurate control. While the fusible material may operate with various portions of the running mechanism of the timer it is preferable to have it co-operate with an end or extension of one of the rotatable shafts and as embodied in the illustrative organization the shaft 62 of gear 44 is extended so that it extends through a suitable opening in plate 47 with the shaft extending through sleeve 58 that is secured within this opening and with a seal 60 being provided to prevent fluid leakage downwardly along the shaft. The upper end of shaft 62 is flattened as shown and a mass of fusible material is retained in engagement with this end of the shaft by means of the inverted cup or retainer 64 which is bonded on the upper surface of plate 47 as at 66. The mass of material 68 retained within cup 64 may be any desired alloy or crystalline compound which is chosen to melt at the desired temperature at which it is desired to have the timer begin to run.

Among the suitable materials are the lead-tin-bismuth alloys, which can be adjusted for melting temperatures by suitably proportioning the percentage composition of the alloy. One such suitable alloy is Wood's metal. It is preferred to use, however, sharply melting substances, such as crystalline compounds, which may be selected to have the desired melting point, and stability. Thus for a temperature of 119° C., iodoform may be used. The following are typical of other compounds which may be used for other melting temperatures:

| | °C.M.P. |
|---|---|
| Succinic anhydride | about 119.6 |
| p-Xylene | about 13.2 |
| 1-phenyl-2 propanone | about −15.4 |
| 1-methyl-imidazole | about −6 |

In the operation of the embodiment of FIGURES 6 and 7 when the melting temperature of the mass of material 68 is exceeded shaft 62 and accordingly the timer is free to run until the temperature decreases and allows the mass to congeal at which time rotation of the gear train and running of the timer is prevented.

In each of the illustrative embodiments of the invention the timer is wound by means of the knob 12 with the timer being wound by turning the knob from the end to the start position as identified in FIGURE 2. The indices on the cover of the timer that cooperate with the pointer formed on the knob indicate the hours that the timer has run from the start or wound position and accordingly provide a totalized indication of the amount of time that the timer has passed a given temperature with assurance being had with the organization of the present invention that the indicated total is accurate and that the timer will start automatically when the temperature responsive control device releases the mechanism for running.

The invention in its broader aspects is not limited to the specific mechanisms shown and described but departures may be made therefrom within the scope of the accompanying claims without departing from the principles of the invention and without sacrificing its chief advantages.

What is claimed is:

1. A spring actuated temperature controlled timer for totalizing the time that the timer is subjected to a predetermined temperature variation comprising: a substantially water and air-proof casing, a pair of plates mounted within said casing, a spring-driven gear train mounted within said casing and between said plates, a self-starting balance wheel escapement mounted within said casing regulating said gear train and including a pallet wheel mounted between said plates, a balance wheel mounted between said plates and having a pallet fixedly mounted thereon with the pallet faces engaging the teeth of said pallet so that the escapement is self-starting, means responsive to movement of said gear train including a portion located outside of said casing for totalizing the time of running of said train, a bi-metallic strip having a flange at one end fixedly mounted to at least one of said plates and having the other end movable to and from engagement with the periphery of said balance wheel.

2. A spring actuated temperature controlled timer for totalizing the time that the timer is subjected to a predetermined temperature variation comprising: a substantially water and air-proof casing, a pair of plates mounted within said casing, a spring driven gear train mounted within said casing and between said plates, a self-starting balance wheel escapement mounted within said casing regulating said gear train and including a pallet wheel mounted between said plates, a balance wheel mounted between said plates and having a pallet fixedly mounted thereon with the pallet faces engaging the teeth of said pallet so that the escapement is self-starting, means responsive to movement of said gear train including a portion located outside of said casing for totalizing the time of running of said train, a bi-metallic strip having a flange at one end fixedly mounted to at least one of said plates and having the other end movable to and from engagement with the periphery of said balance wheel, said bi-metallic strip being constructed and arranged so that the end portion moves away from said balance wheel when the temperature exceeds a given temperature.

3. A spring actuated temperature controlled timer for totalizing the time that the timer is subjected to a predetermined temperature variation comprising: a substantially water and air-proof casing, a pair of plates mounted within said casing, a spring-driven gear train mounted within said casing and between said plates, a self-starting balance wheel escapement mounted within said casing regulating said gear train and including a pallet wheel mounted between said plates, a balance wheel mounted between said plates and having a pallet fixedly mounted thereon with the pallet faces engaging the teeth of said pallet so that the escapement is self-starting, means responsive to movement of said gear train including a portion located outside of said casing for totalizing the time of running of said train, a bi-metallic strip having a flange at one end fixedly mounted to at least one of said plates and having the other end movable to and from engagement with the periphery of said balance wheel, said bi-metallic strip being constructed and arranged so that the end portion moves away from said balance wheel when the temperature falls below a given temperature.

4. A spring actuated temperature controlled timer for totalizing the time that the timer is subjected to a predetermined temperature variation comprising: a substantially water and air-proof casing, a pair of plates mounted within said casing, a spring-driven gear train mounted within said casing and between said plates, a self-starting balance wheel escapement mounted within said casing regulating said gear train and including a pallet wheel mounted between said plates, a balance wheel mounted between said plates and having a pallet fixedly mounted thereon with the pallet faces engaging the teeth of said pallet so that the escapement is self-starting, means including a winding shaft for said spring-driven gear train cooperating with indicia located outside of said casing for totalizing the time of running of said gear train in response to movement thereof and a bi-metallic strip having one end fixedly secured and the other end movable to and from engagement with the periphery of said balance wheel in response to predetermined temperature changes.

References Cited in the file of this patent

UNITED STATES PATENTS

| | | |
|---|---|---|
| 1,678,130 | Tyler | July 24, 1928 |
| 1,971,058 | Walder | Aug. 21, 1934 |
| 1,994,537 | Scoville | Mar. 19, 1935 |
| 2,037,360 | Barenyi | Apr. 14, 1936 |
| 2,486,602 | Jensen | Nov. 1, 1949 |
| 2,667,921 | Doyle | Feb. 2, 1954 |
| 2,705,048 | Wiley | Mar. 29, 1955 |
| 2,764,027 | Otto | Sept. 25, 1956 |
| 2,841,014 | Bondurant | July 1, 1958 |